May 2, 1933.  F. D. JONES  1,907,071
HAY LOADER
Filed Jan. 25, 1932
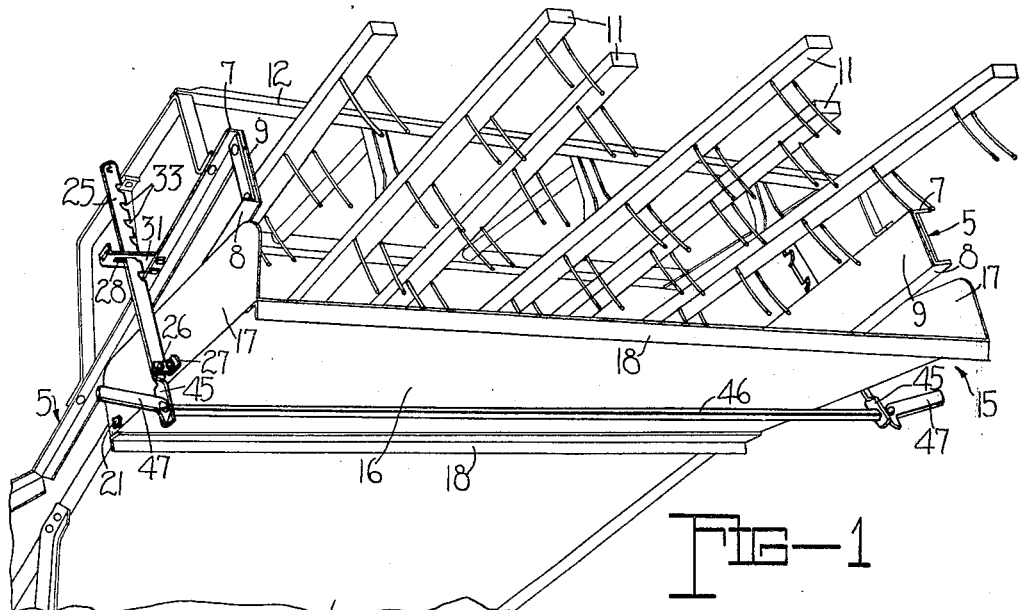
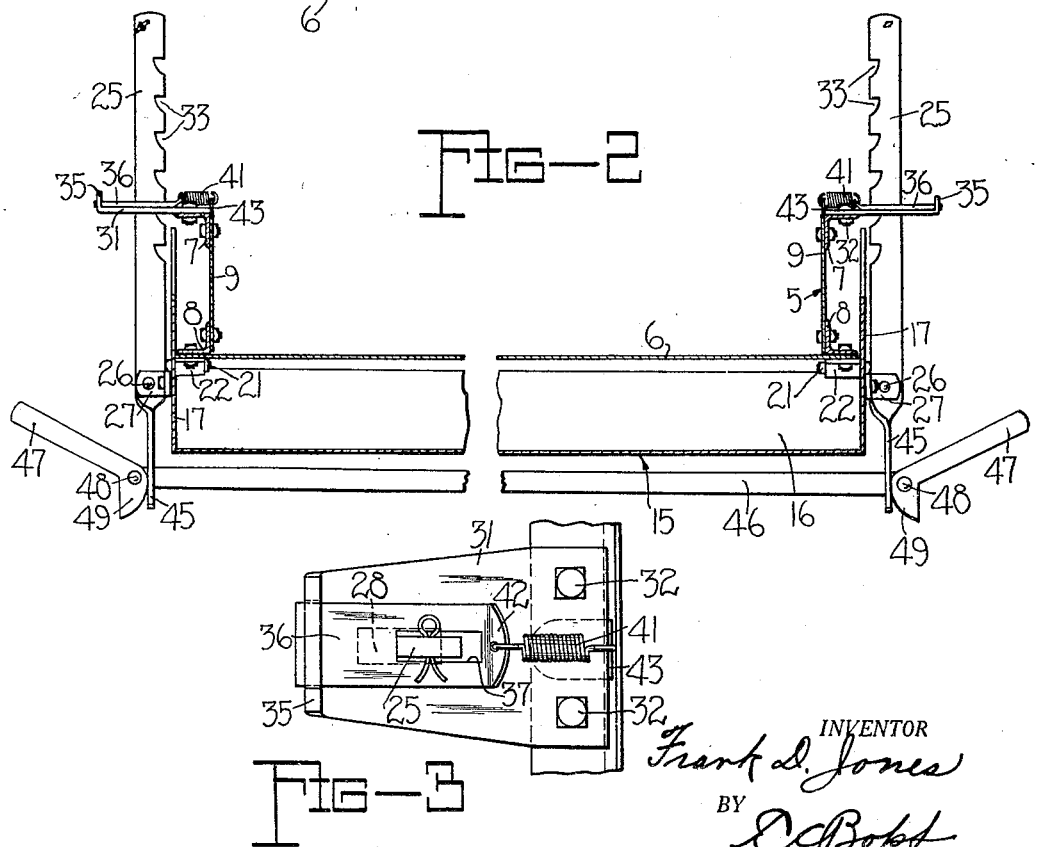
INVENTOR
Frank D. Jones
BY
ATTORNEY Patented May 2, 1933

1,907,071

UNITED STATES PATENT OFFICE

FRANK D. JONES, OF OTTUMWA, IOWA, ASSIGNOR TO DAIN MANUFACTURING COMPANY OF IOWA, OF OTTUMWA, IOWA, A CORPORATION OF IOWA

HAY LOADER

Application filed January 25, 1932. Serial No. 588,543.

My invention relates to hay loaders and particularly to that type of loader having an adjustable apron pivoted at the upper end of the loader deck and adjustably supported by arms provided at each side thereof; and an object of my invention is to provide improved adjustable holding means for the apron whereby both of the arms may be adjusted simultaneously.

Another object of my invention is to provide a releasable holding means at each side of the adjustable apron which may be controlled from either side of the implement and positioned in such a manner as not to become bent or broken by parts of the wagon when the hay loader is hitched thereto.

Other objects of my invention will be apparent to those skilled in the art after a consideration of the following detailed description taken in conjunction with the accompanying drawing wherein:

Figure 1 is a perspective view of the upper end of a hay loader and illustrating my improved adjustable holding means for the apron;

Figure 2 is an enlarged transverse sectional view taken through the apron and looking in a rearward direction to show the holding means; and, Figure 3 is an enlarged fragmentary plan view of the holding means.

The hay loader with which I have incorporated my improved holding means in the present instance is of the reciprocating raker bar type. This type of hay loader includes an elevating deck having sides 5 and a bottom 6. The sides 5 comprise upper and lower angle iron bars 7 and 8 to which are secured a side sheet 9. The bottom 6 is secured to the lower angle iron bars 8 of the side members. Reciprocating raker bars 11 are supported above the elevating deck by the usual transverse supporting frame 12 which is secured to the upper angle iron bars 7.

It is customary in hay loaders to provide an adjustable apron adjacent the upper end of the elevating deck which apron is adapted to overhang the rear end of the wagon and which may be pivoted downwardly when starting the load and raised as the load builds up so that the hay will be less affected by the wind. The adjustable apron, which is referred to in its entirety by numeral 15, comprises a bottom 16 and sides 17. The bottom 16 is braced against twisting by reinforcing angles 18 which are secured to the under side of the bottom adjacent each end thereof. The apron 15 is pivotally mounted adjacent its rear end on pivot bolts 21 which extend outwardly from supporting blocks 22 secured to the frame bars 8. The pivot bolts 21 extend through holes formed in the sides 17.

The front end of the apron is held in any desired position of adjustment by means of arms 25 which are pivotally supported at 26 on brackets 27 secured to the sides 17.

The arms 25 are arranged edgewise relative to the sides 17 of the apron and extend upwardly from the pivots 26. The upper end of each of the arms 25 extends through a slot 28 formed in a latch plate 31 which is secured to each of the angle iron bars 7 by bolts 32. A plurality of notches 33 are formed on the inner edge of each of the arms 25 and these notches are adapted to selectively engage the inner end of the adjacent slot 28 to hold the apron 15 in any desired position. The outer end 35 of latch plate 31 is bent upwardly and an opening is provided therein to receive one end of a sliding plate 36 which rests on the upper side of plate 31. A centrally disposed slot 37 is formed adjacent the inner end of plate 36 and is adapted to embrace the upper end of arm 25.

In the normal position of the arms 25, they are held with a selected one of the notches 33 in engagement with the inner end of the slot 28 by means of a spring 41. Spring 41 extends between an upturned end 42 formed on the inner end of plate 36 and a clip 43 which is clamped between the plate 31 and angle iron bar 7 and bent upwardly at right angles thereto. To change the adjustment of the adjustable apron the arms 25 are moved outwardly at their upper ends about the pivots 26 free from the end of the slot 28 whereupon the apron may be raised or lowered to the desired position. Upon releasing the arms 25 the apron will be held by a different notch registering with the end of the slot.

In prior mechanisms with which I am familiar, the operator must first adjust one side of the apron and then move across the load to adjust the other side, or adjust it from the center, to change the position of the apron. This is particularly inconvenient if the implement is in motion since the flow of hay forms a barrier over or around which the operator must pass. A particular feature of my improved adjusting mechanism enables the operator to simultaneously adjust both of the arms from either side of the implement and I will now describe the mechanism which I employ for this purpose.

Each arm 25 is provided with an extension 45 extending below the pivot 26. These extensions are bent around a quarter turn so as to be disposed flatwise relative to the apron 15. The extensions 45 are connected together by means of a transverse tie rod 46 which extends through aligned slots therein. The tie rod 46 is retained against endwise displacement by means of levers 47 which are pivoted at 48 at each end of the rod. A cam or eccentric head 49 is formed on each lever 47 in such a manner as to contact with the outer face of the adjacent lower portion 45. When either lever 47 is actuated, the extensions 45 are drawn inwardly until the outer edges of arms 25 contact with the outer ends of the slots 28. Sufficient camming surface is provided on each head 49 that by the actuation of one lever alone, both arms 25 can be forced against the rear ends of the slots 28. The slots 28 are of sufficient length that when arms 25 contact with the outer ends thereof the notches 33 will be disengaged from the inner ends thereof. With either lever 47 actuated, the adjustable apron 15 may be raised or lowered as desired. When the lever is returned to its normal position, the springs 41 draw the arms 25 inwardly until the adjacent notch 33 of said arms engage the inner end of the respective slots 28, to hold the apron in such adjusted position.

It is evident that with the provision of levers 47 at each end of the tie rod 46 the operator may adjust the apron 15 from either side of the implement, thereby making it unnecessary for him to change his position on the load for this purpose.

While I have described in connection with the accompanying drawing the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. The combination with a hay loader having a frame and an adjustable apron pivotally attached to the frame, of supporting arms mounted for transverse pivotal movement at each side thereof for adjustably supporting the apron, and means at one side of the implement for simultaneously rocking both of said arms about their pivots to adjust the apron from one position to another.

2. The combination with a hay loader having a frame and an adjustable apron pivotally attached to the frame, of a supporting arm pivotally mounted at each side of the apron and adjustably engaging with the frame, a lower extension on each supporting arm below the pivot, and means cooperating with said lower extensions to simultaneously release both of said arms from engagement with said frame to adjust the apron from one position to another, said means being operable from either side of the implement.

3. The combination with a hay loader having a frame and an adjustable apron pivotally attached to the frame, of a supporting arm pivotally mounted at each side of the apron and adapted to adjustably engage with the frame, an extension on each supporting arm below the pivot, aligned slots in said extensions, a tie rod extending through the aligned slots, and a lever pivoted on each end of the tie rod and cooperating with the adjacent extension, each lever being capable of simultaneously releasing both of said arms from engagement with said frame to adjust the apron from one position to another.

4. The combination with a hay loader having a frame and an adjustable apron pivotally attached to the frame, of a supporting arm pivotally mounted at each side of the apron and adapted to adjustably engage with the frame, an extension on each supporting arm below the pivot, aligned slots in said extensions, a tie rod extending through the aligned slots, and a lever pivoted on each end of the tie rod and having an eccentric head positioned to contact with the adjacent extension, whereby through the actuation of either lever both of said arms may be released from engagement with said frame to adjust the apron from one position to another.

5. The combination with a hay loader having a frame and an adjustable apron pivotally attached to the frame, of a supporting arm pivotally mounted on each side of the apron and having a plurality of notches, a resilient means adapted to normally hold a selected one of the notches in engagement with said frame, an extension on each supporting arm below the pivot, said extension having aligned openings in the ends thereof, a tie rod extending through the aligned openings, and a lever pivoted on each end of the tie rod and having an eccentric head positioned to contact with the adjacent extension, each of said eccentric heads having sufficient camming surface that by the actuation of one lever alone both arms will be released from engagement with the frame to adjust the apron from one position to another.

6. The combination with a hay loader having a frame and an adjustable apron pivotally attached to the frame, of a supporting arm pivotally mounted at each side of the apron and having a plurality of notches along the inner edge thereof, a pair of brackets secured to the frame at opposite sides thereof and extending outwardly therefrom and having slots to receive the supporting arms, a plate having sliding engagement with the upper face of the bracket, an upturned flange at the outer edge of each bracket having a slot to receive said plate, a recess in the inner end of the plate aligning with the slot in the bracket and embracing the supporting arm, a spring between the sliding plate and the bracket to force the arm inwardly so that a selected one of the notches will engage the inner end of the slot, said slot being of sufficient length that when the arm is moved outwardly against the outer end of the slot the notch will be disengaged from the inner end of the slot whereupon the apron may be adjusted from one position to another.

7. The combination with a hay loader having a frame and an adjustable apron pivotally attached to the frame, of a supporting arm pivotally mounted on each side of the apron and having a plurality of notches along the inner edge thereof, a pair of brackets secured to the frame at opposite sides thereof and having slots to receive the supporting arms, a resilient means adapted to normally hold a selected one of the notches in engagement with the inner end of the slot, said slots being of such length that when the arms are moved into contact with the outer end of the slots the notches are disengaged from the inner end thereof, an extension on each supporting arm below the pivot, said extension having aligned openings in the ends thereof, a tie rod extending through the aligned openings, and a lever pivoted on each end of the tie rod and having an eccentric head positioned to contact with the adjacent extension, each of said eccentric heads having sufficient camming surface that by the actuation of one lever alone both arms will be moved into contact with the outer ends of the slots.

8. The combination with a hay loader having a frame and an adjustable apron pivotally attached to the frame, of a supporting arm pivotally mounted at each side of the apron and adjustably engaging with the frame, a lower extension on each supporting arm below the pivot, and means cooperating with said lower extensions to simultaneously release both of said arms from engagement with said frame to adjust the apron from one position to another.

9. The combination with a hay loader having a frame and an adjustable apron pivotally attached to the frame, of a supporting arm mounted for transverse pivotal movement at each side of the apron and having a plurality of notches along one edge thereof, a pair of brackets secured to the frame at opposite sides thereof and adapted to selectively engage said notches, and means for rocking said arms about their pivots to disengage said arms from said brackets to adjust the apron from one position to another.

10. The combination with a hay loader having a frame and an adjustable apron pivotally attached to the frame, of a supporting arm mounted for transverse pivotal movement at each side of the apron and having a plurality of notches along one edge thereof, a pair of brackets secured to the frame at opposite sides thereof and adapted to selectively engage said notches, and means at one side of the implement for simultaneously rocking both of said arms about their pivots to disengage said arms from said brackets to adjust the apron from one position to another.

11. The combination with a hay loader having a frame and an adjustable apron pivotally attached to the frame, of a supporting arm pivotally mounted on each side of the apron and having a plurality of notches, a resilient means adapted to normally hold a selected one of the notches in engagement with said frame, an extension on each supporting arm below the pivot, said extension having aligned openings in the ends thereof, a tie rod extending through the aligned openings, and a lever on one end of the tie rod and having an eccentric head positioned to contact with the adjacent extension, said eccentric head having sufficient camming surface that by the actuation of said lever both arms will be released from engagement with the frame to adjust the apron from one position to another.

12. The combination with a hay loader having a frame and an adjustable apron pivotally attached to the frame, of a supporting arm mounted for transverse pivotal movement at each side of the apron, holding means at each side of the frame engaged by said arms when the latter are in a certain position to hold the apron in a selected position relative to the frame, and means for rocking both said arms simultaneously to another position to disengage the arms from said holding means to permit adjustment of the apron to any other selected position.

13. The combination with a hay loader having a frame and an adjustable apron pivotally attached to the frame, of a supporting arm mounted for transverse pivotal movement at each side of the apron, holding means at each side of the frame engaged by said arms when the latter are in a certain position to hold the apron in a selected position relative to the frame, means for yieldingly holding said arms in said certain position, and means for rocking both said arms simultaneously to another position to disengage the arms from said holding means to permit adjustment of the apron to any other selected position.

In witness, whereof, I hereunto subscribe my name this 14th day of January, 1932.

FRANK D. JONES.